Patented Apr. 10, 1923.

1,451,113

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF PRODUCING CATALYTIC MATERIAL.

No Drawing.   Application filed September 13, 1921.   Serial No. 500,357.

*To all whom it may concern:*

Be it known that I, GEORGE A. RICHTER, a citizen of the United States, residing at Berlin, in the county of Coos and State of New Hampshire, have invented new and useful Improvements in Processes of Producing Catalytic Material, of which the following is a specification.

This invention relates to the preparation of catalytic material, such as employed, for example, in the hydrogenation of fatty acids and their glycerides and esters.

When metallic zinc is placed in a nickel salt solution, a double decomposition takes place, the nickel being precipitated with the formation of a soluble zinc salt. Nickel, prepared in this manner from finely divided metallic zinc, is only weakly catalytic. I have discovered, however, that if the zinc be used in the form of small particles such as granules or feathers, and the reaction is caused to take place under grinding conditions, as for example in a ball mill, the resulting powder possesses much higher activity when used for hydrogenation purposes. Accordingly my process consists in precipitating nickel from a nickel salt solution by means of metallic zinc and simultaneously subjecting the mass to a grinding action. The precipitated nickel is settled out and is washed to free it from the zinc salt solution, after which it is dried in an inert atmosphere or under a vacuum as may be desired. I may use any suitable salt, such as nickel chloride or nickel sulphate, although for some purposes nickel sulphate is preferable, since I have noted that the activity of the nickel is higher when precipitated from nickel sulphate than from nickel chloride.

What I claim is:—

1. The method of producing a catalytic material, which comprises precipitating metallic nickel from a nickel salt solution by the addition of zinc and simultaneously grinding the mass, and separating out the precipitated nickel.

2. The method of producing a catalytic material, which comprises precipitating metallic nickel from a nickel salt solution by the addition of zinc particles and simultaneously therewith subjecting the mass to a grinding action, and separating out the precipitated nickel.

3. The method of producing a catalytic material, which comprises precipitating metallic nickel from a nickel sulphate solution by the addition of zinc feathers and simultaneously therewith subjecting the mass to a grinding action, and separating out the precipitated nickel.

In testimony whereof I have affixed my signature.

GEORGE A. RICHTER.